United States Patent [19]

Strahl et al.

[11] Patent Number: 5,333,900

[45] Date of Patent: Aug. 2, 1994

[54] AIRBAG COVER RETAINER WITH WIRE RETENTION FEATURE AND GROUND

[75] Inventors: Paul Strahl, Ogden, Utah; Michael D. Frakes, Lake Angeles, Mich.

[73] Assignees: Morton International, Inc., Chicago, Ill.; Chrysler Corporation, Auburn Hills, Mich.

[21] Appl. No.: 985,904

[22] Filed: Dec. 4, 1992

[51] Int. Cl.⁵ .............................................. B60R 21/22
[52] U.S. Cl. .................................. 280/731; 200/61.54
[58] Field of Search ............... 280/728 R, 730 R, 731, 280/735; 200/61.54; 439/34

[56] References Cited

U.S. PATENT DOCUMENTS

| 1,125,952 | 1/1915 | Brown | 200/61.54 |
| 2,235,069 | 3/1941 | Geyer | 200/61.54 |
| 2,853,013 | 12/1958 | Brown et al. | 200/61.54 |
| 4,581,508 | 4/1986 | Shanklin et al. | 200/61.54 |
| 5,198,629 | 3/1993 | Hayashi | 280/731 |

Primary Examiner—Karin L. Tyson
Attorney, Agent, or Firm—Parmelee, Bollinger & Bramblett

[57] ABSTRACT

A cover retainer for an airbag vehicle occupant restraint module includes means formed integrally thereon for both retaining and securing the horn wires and providing a system ground connection.

2 Claims, 2 Drawing Sheets

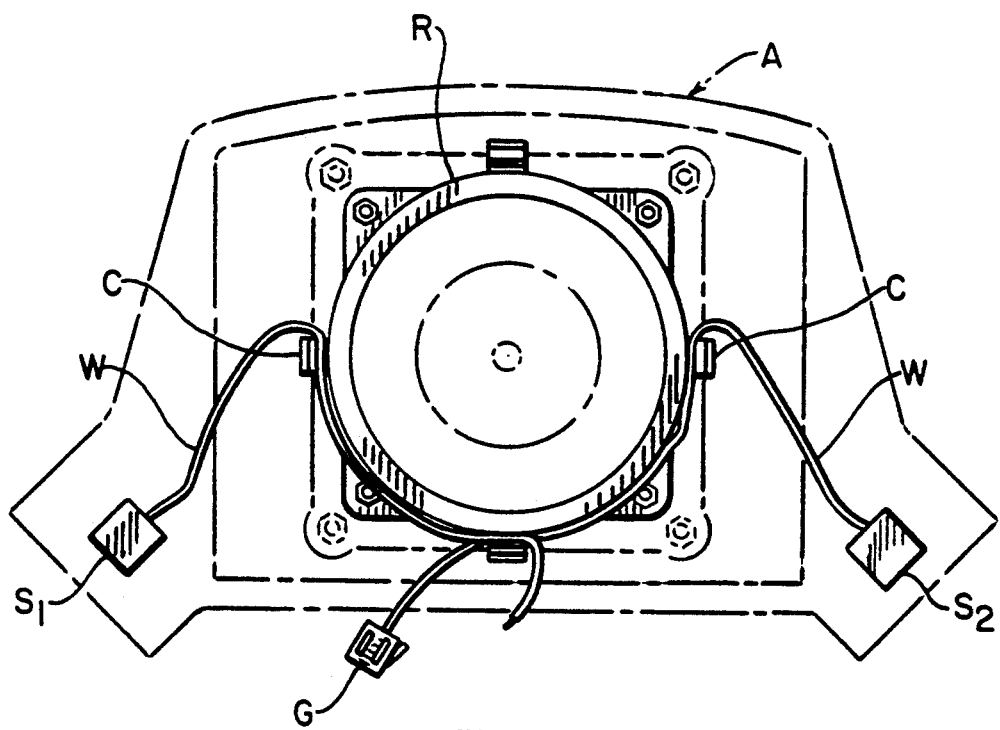
FIG. I
PRIOR ART
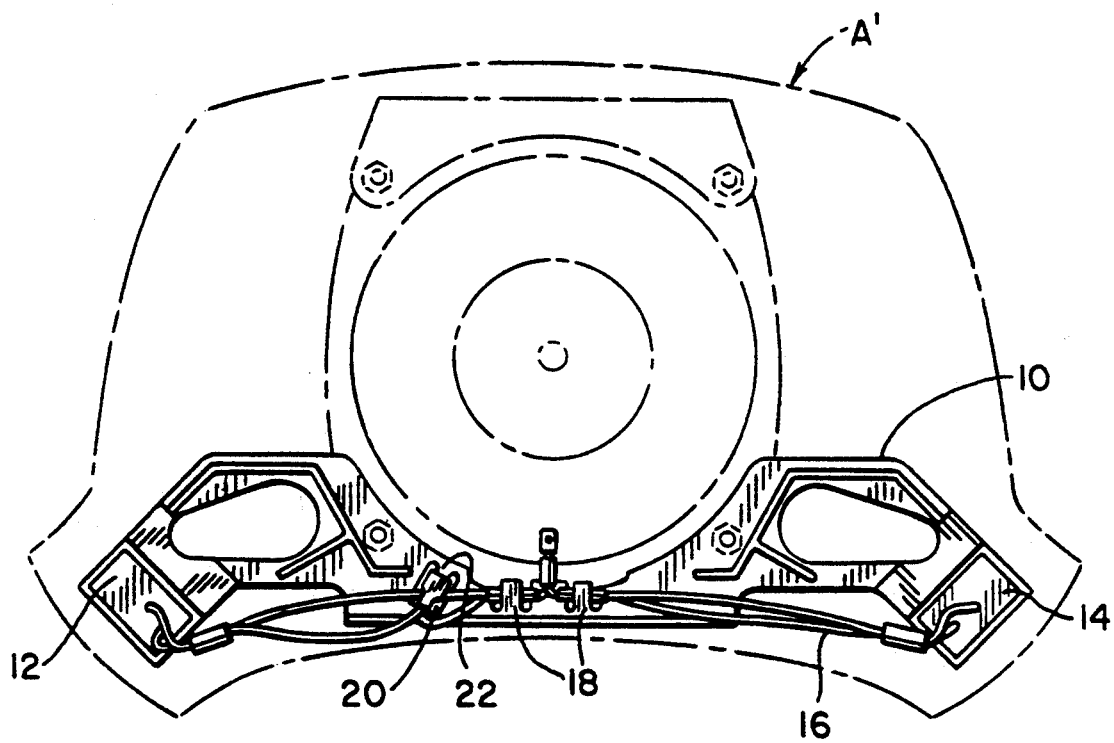
FIG. 2

AIRBAG COVER RETAINER WITH WIRE RETENTION FEATURE AND GROUND

TECHNICAL FIELD

This invention relates to improvements in the field of airbag modules for vehicle occupant restraint systems.

BACKGROUND ART

It is known in the prior art to employ cover retainers as part of the airbag module for drivers' side airbag installations. It is also known in the prior art to employ cover retainers as support for horn switch elements and for mounting airbag modules to steering wheels. A typical module is comprised of a housing in the form of a reaction plate, an inflator containing rapid burning gas generant, a folded airbag, and a rupturable decorative cover. Oftentimes modules also include horn and speed control elements. The cover includes designed tear seams permitting the cover to open upon bag pressurization from the rapidly burning gas generant. A cover retainer is employed to prevent the cover from separating from the housing during cover opening and bag filling stages of the airbag deployment. The retainer may also serve to mount the airbag module to the steering wheel and to hold horn or speed control switch elements. Because the horn switch elements are an integral part of the airbag module, the horn wiring is also a part of the module.

Normally, the airbag modules are manufactured at a facility distant from the final vehicle assembly plant. Accordingly, it is important to protect the wiring during shipment and also to protect it during the process of incorporating the module into the vehicle steering unit. A separate plastic or metal member is normally employed to retain and protect the horn wiring. This member may be in the form of a ring around which the wire is guided. It includes integral clips for securing the wire to the ring and mounting holes for engaging the ring to the module. A ground connection for the wiring is also required which must be electrically connected into the vehicle chassis at the time the module is installed in the vehicle.

It is a primary object of the present invention to simplify the construction and reduce the cost of airbag modules by abolishing the need for the wire retainer. Another object is to simplify the assembly of the module into the vehicle by eliminating the need to make a separate ground connection. Other objects, features and advantages will become apparent from the following description and appended claims.

DISCLOSURE OF INVENTION

The invention comprises an airbag cover retainer having integrally formed therein wire retainers and a grounding tab. The wire retainers protect the wire during shipment and installation. The grounding tab permits the ground connection to be made at the time the module is manufactured, rather than during final assembly of the vehicle.

BRIEF DESCRIPTION OF DRAWINGS

FIG. 1 is a rear view of a prior art airbag assembly illustrated in dashed-dotted lines with a solid line showing of a wire retainer and horn switch wiring;

FIG. 2 is a view similar to that of FIG. 1 but illustrating the improved retainer of this invention.

BEST MODE FOR CARRYING OUT THE INVENTION

Figure 3:
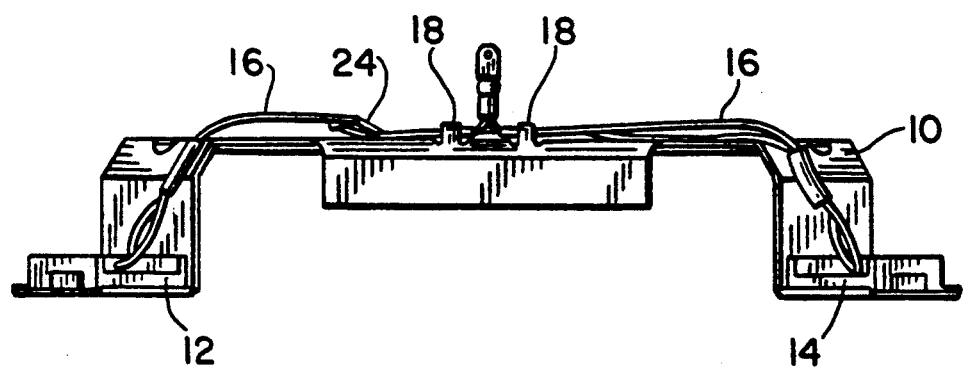
FIG. 3 is a front view of the retainer illustrated in FIG. 2.

FIG. 1 illustrates an airbag module A in accordance with the prior art upon which are mounted horn switch elements $S_1$, $S_2$. The wiring W from the switch elements is retained by clips C molded integrally on a plastic retainer ring R. The retainer ring R encircles the circular inflator that is attached to the module housing by studs and nuts. The mounting holes of the retainer ring are designed to engage threads on the inflator mounting studs. A ground connector G is provided for connection to an external ground at the time the module is installed in a vehicle's steering wheel.

In FIGS. 2 and 3 there is illustrated an improved retainer 10 constructed in accordance with this invention. The airbag module A' upon which it is mounted does not form a part of this invention. Accordingly, it is illustrated in dashed-dotted lines. The retainer 10 is constructed of sheet metal and is arranged to retain the rupturable cover on the airbag module A' in the manner known in the prior art. Mounted on the extremities of the retainer 10 are elements 12, 14 of two horn switches to which are attached wires 16. In order to circumvent the need for the retainer ring R used in the prior art, there are formed in the body of the retainer 10 a pair of spaced tabs 18 which are positioned over the wire 16 as illustrated in order to hold the wire firmly in position. This insures that the wiring is protected during shipment of the module. It also keeps the wiring compactly retained against the module so that it is less likely to be snagged or otherwise disturbed as the module is mounted in the vehicle. Furthermore, it keeps the wire from vibrating and creating noise during vehicular motion, thus eliminating the potential for wire rattle warranty.

When the airbag module is installed in the vehicle, the retainer 10 is connected to the system ground via the reaction plate and the steering column. The body of the retainer 10 defines a cutout 20 enclosing a male terminal 22 which is integral with the retainer. The wiring 16 is connected to ground via the terminal 22 by a female grounding connector 24. As the connection between connector 24 and terminal 22 was made during manufacture of the airbag module, that particular step is removed from the final vehicle assembly process.

It will now be seen that, by means of the present invention, it has been possible to eliminate an element formerly required in the airbag module, thereby reducing its complexity and cost. Furthermore, one step in the process of final assembly of the vehicle has also been eliminated. It will also be apparent that a number of variations and modifications may be made in this invention without departing from its spirit and scope. Accordingly the foregoing description is to be construed as illustrative only, rather than limiting. This invention is limited only by the scope of the following claims.

We claim:

1. In a driver's side vehicle occupant restraint module of the type including an airbag, inflator, rupturable module cover and two horn switches with associated conductive horn wiring connecting the two horn switches, the improvement comprising an electrically conductive retainer mounting the two horn switches at spaced-apart positions, the retainer being fabricated of one piece and having at least one tab formed thereon between the two horn switches and receiving the horn wiring for positioning, securing and protecting the horn wiring, and a terminal formed on the retainer to receive a ground wire of the horn wiring, whereby mounting the retainer with the module to a grounded portion of the vehicle grounds the horn switches.

2. The improvement of claim 1 wherein said terminal is male.

* * * * *